United States Patent [19]

Mason

[11] 4,177,516

[45] Dec. 4, 1979

[54] ELECTRONIC DIGITAL GOVERNOR

[75] Inventor: Ralph I. Mason, Calgary, Canada

[73] Assignee: Shaw GMC Trucks Ltd., Calgary, Canada

[21] Appl. No.: 869,766

[22] Filed: Jan. 16, 1978

[30] Foreign Application Priority Data

Feb. 15, 1977 [CA] Canada .................................. 271857

[51] Int. Cl.$^2$ ........................ G06F 15/20; F02D 31/00

[52] U.S. Cl. .................................... 364/431; 123/102; 364/565

[58] Field of Search ....................... 364/431, 442, 565; 123/102; 73/507; 324/169

[56] References Cited

U.S. PATENT DOCUMENTS

| | | | |
|---|---|---|---|
| 3,750,633 | 8/1973 | Ohtani et al. | 123/102 |
| 3,998,191 | 12/1976 | Beyerlein et al. | 123/102 |
| 4,090,480 | 5/1978 | Kasiewicz | 123/102 |

*Primary Examiner*—Jerry Smith

[57] ABSTRACT

The present invention relates to an electronic digital governor for controlling the RPM of an engine. The governor is comprised of a clock generator which includes a clear pulse generator and a latch pulse generator. A sensor is provided for receiving a train of pulses whose number per unit time is proportional to the RPM of the engine. A counter is provided connected to the sensor for counting the number of pulses in the train of pulses. The count is carried out between consecutive clear pulses fed to the counter from the clear pulse generator. A latch is provided connected to the counter for storing a count accumulated between consecutive clear pulses. The latch is controlled by latch pulses from the latch pulse generator. The time duration between consecutive clear pulses and consecutive latch pulses is the same and is equal to a predetermined time period T. A comparator is provided which has a first input connected to the latch and a second input connected to a switch which is manually controllable to enter an upper bound RPM value. The comparator compares the stored count in the latch with the upper bound RPM value and activates a relay if the stored value is greater than the upper bound RPM value. An electromechanical device is provided which is controllable by the relay for controlling the RPM of the engine to reduce the RPM below the upper bound RPM value.

14 Claims, 7 Drawing Figures

PULSES REPRESENTING R.P.M. OF ENGINE
INPUT SHAPER
10
12
14
COUNTER
16
CLEAR PULSE GENERATOR
22
CLOCK
18
LATCH
20
LATCH PULSE GEN.
24
"C"
DISPLAY
COMPARATOR
26
UPPER BOUND ENGINE SPEED
A
28
LOWER BOUND ENGINE SPEED
B
30
C>A
C<B
HIGH RELAY
34
LOW RELAY
36
CONTROLS SOLINOID TO REDUCE ENGINE SPEED.
CONTROLS SOLINOID TO INCREASE ENGINE SPEED.

LATCH
CLEAR
COUNTED PULSES
T
T

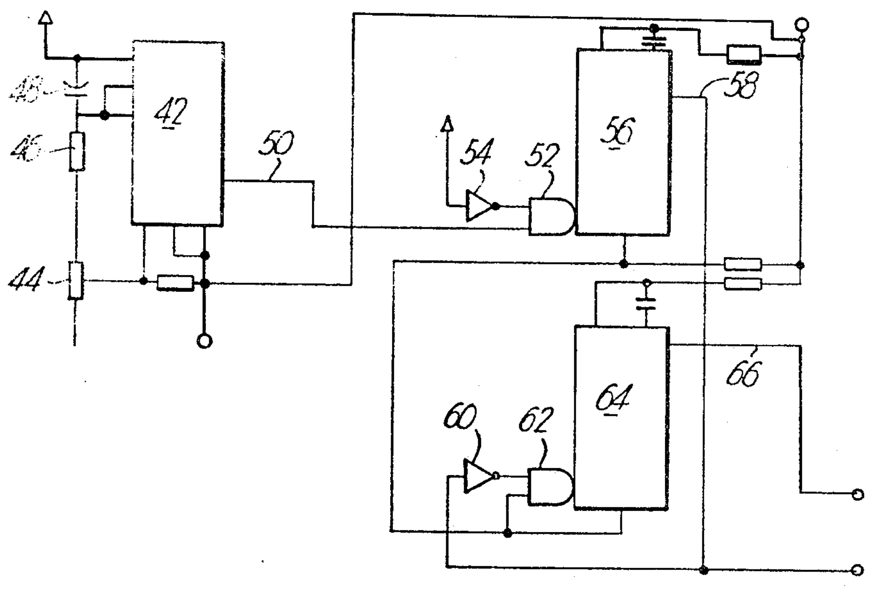
~Fig~4~
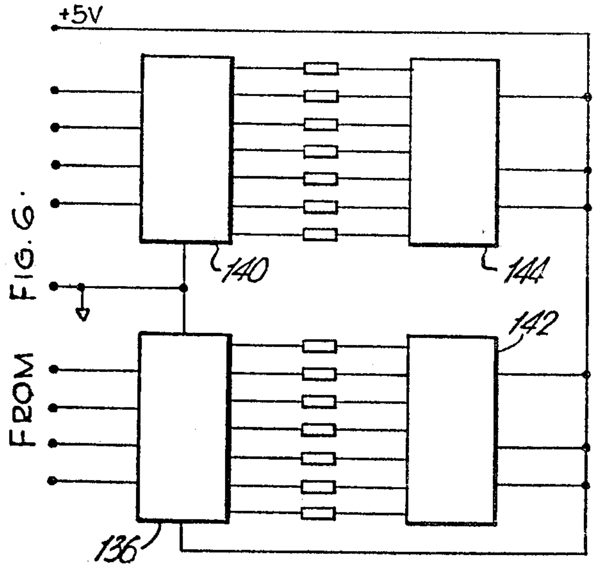
~Fig~7~

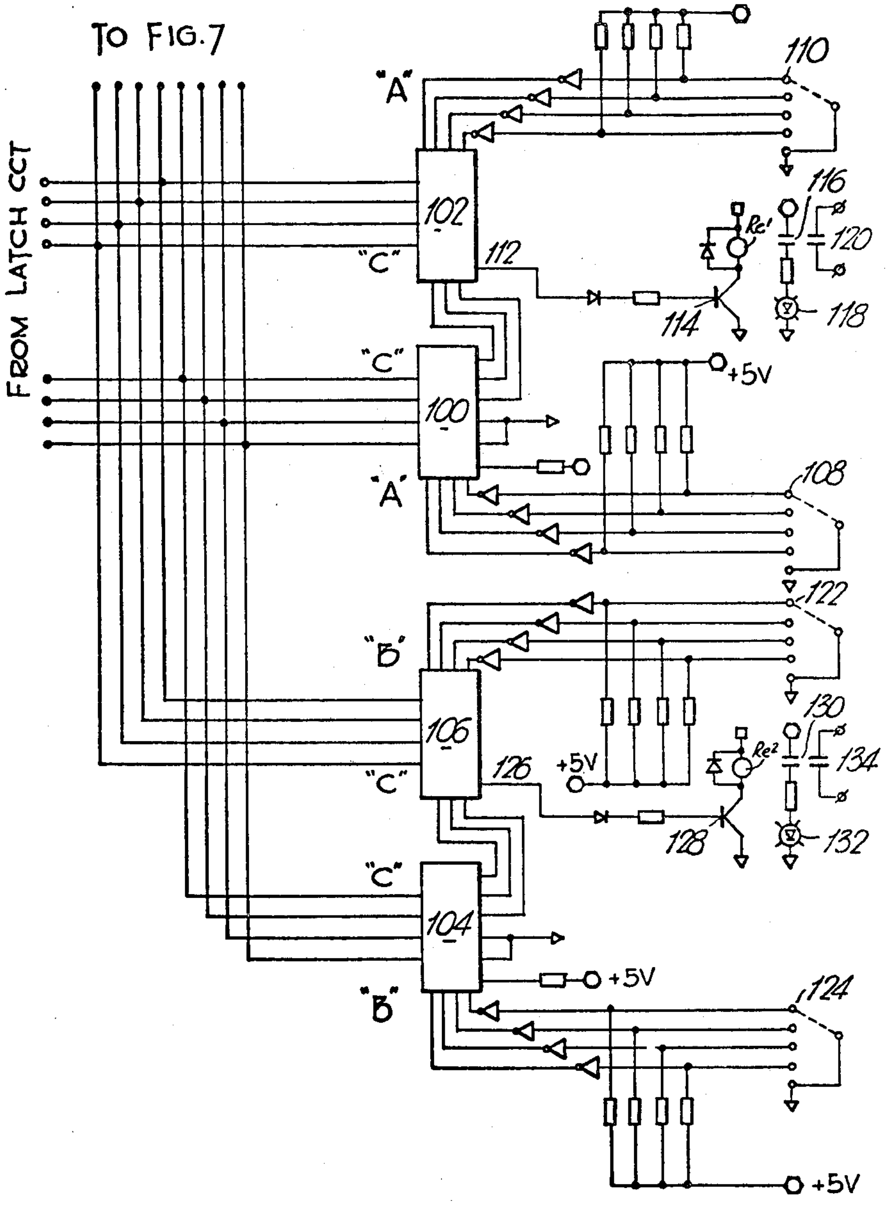
~Fig~6~

ELECTRONIC DIGITAL GOVERNOR

The present invention relates to a digital governor and tachometer. The present invention can be used to control the speed of rotation of an internal combustion engine. One embodiment of the present invention can be used in conjunction with the vacuum governor of an engine which is standard equipment on the engine, for accurately controlling the speed of the engine, in applications where the engine is, for example, driving a hydraulic pump.

Existing mechanical type spinner governors cannot maintain the speed of rotation of an engine to protect, for example, a hydraulic pump load from damage due to speed overshoot. The movable parts of the mechanical governor are susceptible to breakdown and wear and maintenance costs are high. The electronic digital governor is virtually maintenance free. There are no moving parts to wear and the accuracy attainable is far superior to the mechanical governor. The governor according to the present invention senses the revolutions of an engine by being directly connected to the distributor of the engine's ignition system. If the device is attached to a diesel engine which does not have an ignition system, a pulse generator must be provided which generates a series of pulses, the number per unit time being proportional to the RPM of the engine.

The digital governor of the present invention receives the pulses from the engine being controlled. These pulses are fed through a shaper and filter which produces at its output a series of pulses having a square shape and a predetermined amplitude. The number of these pulses is equal to the number of pulses generated by the engine.

The pulses are fed to a counter and latch circuit which counts and stores the number of pulses counted over a predetermined time period. The time period is adjustable and is a function of the number of cylinders of the engine.

The engine operator can set the governor to control the engine between upper and lower engine speeds. This is accomplished by dialing into the governor via a series of tumble switches, an upper RPM value above which the speed of the engine is not to exceed and a lower RPM value below which the speed of the engine is not to fall. At the end of each time period the governor compares the pulse count in the latch circuit with a pulse count corresponding to the speeds of the upper and lower bounds to which the governor is manually set. If the actual pulse count indicated that the speed of the engine is higher than the upper bound engine speed the comparator actuates a first eletromechanical device which is connected to the engine to reduce the fuel flow to the engine thereby reducing the RPM of the engine.

If the actual count representing the speed of the engine is below the lower bound engine speed, the comparator actuates a second electromechanical device which is connected to the engine to increase the fuel flow thereby increasing the RPM of the engine.

When the count representing engine speed falls within the count represented by the upper and lower bound of engine speed manually introduced into the governor, the comparator does nothing.

A digital display may be connected to the output of the latch. If the time period is correctly chosen, the count in the latch is directly decodable into RPM so that the display will represent the current RPM. This display and the output of the comparator is, of course, updated every time period.

One embodiment of the present invention controls only the upper RPM of the engine. In other words, the governor has only an upper value. Such a governor can be used when total speed control is not necessary but when RPM overshoot is a problem. The upper bound governor eliminates this problem of engine RPM overshoot.

In accordance with the present invention there is provided an electronic digital governor for controlling the RPM of an engine comprising: clock generator means including a clear pulse generator and a latch pulse generator; a sensor for receiving a train of pulses whose number per unit time is proportional to the RPM of said engine; counting means connected to said sensor means for counting the number of pulses in said train of pulses, said count being carried out between consecutive clear pulses fed to said counter by said clear pulse generator; latch means connected to said counting means for storing a count accumulated between consecutive clear pulses, said latch being controlled by latch pulses from said latch pulse generator, the time duration between consecutive clear pulses and consecutive latch pulses being the same and equal to a predetermined time period T; comparator means having a first input connected to said latch and a second input connected to a switching means which is manually controllable to enter an upper bound RPM value, wherein said comparator compares said stored count with said upper bound RPM value and activates a relay if said stored value is greater than said upper bound RPM value; and an electromagnetic device, controlled by said relay for controlling the RPM of said engine to reduce said RPM below said upper bound RPM value.

The present invention will be described in detail hereinbelow with the aid of the accompanying drawings, in which:

FIGS. 3, 4, 5, 6 and 7 are schematic diagrams of one particular embodiment of the present invention.

It should be understood that the control of the engine is to be held within 100 RPM. Therefore, the governor will only be dealing with the "thousands" and "hundreds" digits of the total RPM. If the engine is operating at 3100 RPM the governor will only be concerned with the number 31. The tumble switches which input the upper and lower bound indicate the "thousands" and "hundreds" digits to the base 10. However, these base 10 digits are coded electrically in the governor as a 4-bit BCD (binary coded decimal). In addition, the optional display, connected to the latch comparator interface converts BCD to decimal display. It is therefore very advantageous if the number of counts per time period can be directly related and decodable to display and compare the first two digits of the RPM. The time period T multiplied by the pulses per second derived from the RPM of the engine being controlled should be equivalent to the RPM (to the base 10) divided by 100. For example, an engine speed of 3100 means that $T \times PPs = 3100/100$.

The pulses per second for a 4 stroke engine $= RPM/60 \times \#/2$ where # is the number of cylinders of the engine.

As a result, the following equation can be derived $$T(RPM/60)\times\#/2=RPM/100$$

Solving this equation for T with respect to number, we obtain $$T=6/5\times 1/\#=1.2/\#$$

For a 8, 6 and 4 cylinder engine the time period would than be 0.15 seconds, 0.2 seconds and 0.3 seconds, respectively. Other time periods could be used, however, it would then be necessary to translate the upper and lower bound inputs at the comparator so that the compared signals would have the same numerical meaning.

Figures 1, 2:
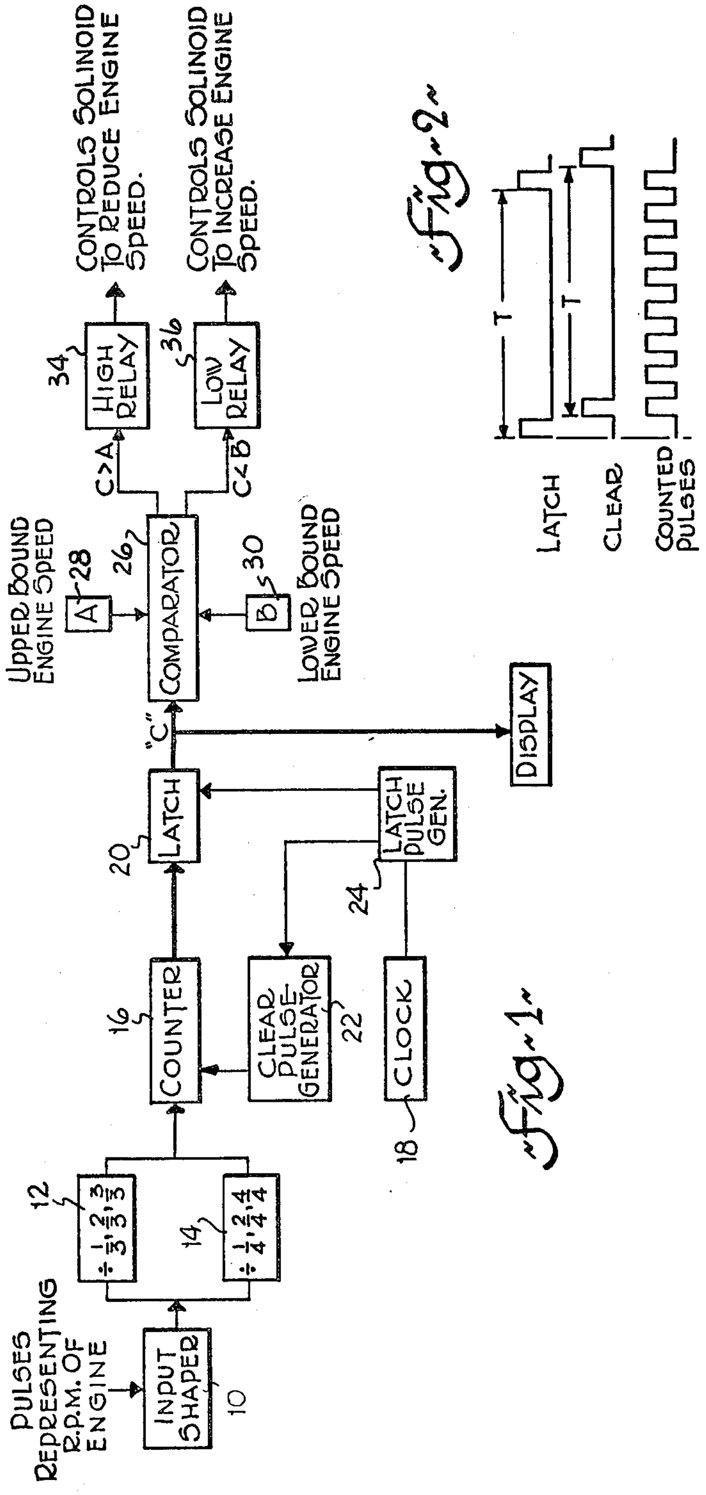
FIG. 1 is a block diagram of one embodiment according to the present invention.
FIG. 2 is a pulse train diagram used in explaining the operation of the present invention.

Referring now to FIGS. 1 and 2, pulses from, for example, the ignition system of an engine to be controlled are fed into an input shaper 10. Shaper 10 removes any signal ring associated with the pulses being introduced. In addition, the shaper clips the voltage level so that at its output, the pulse shaper produces well defined square pulses having a 0 to approximately 5 volt swing. These pulses have been shaped to be compatible in switching the logic curcuits of the electronic governor. The pulses are then fed to a divide-by-3 circuit 12 and to a divide-by-4 circuit 14. These circuits can be manually actuated so that the number of pulses being produced by the engine being controlled can be divided by $\frac{1}{3}$, $\frac{2}{3}$, $\frac{1}{4}$, $\frac{1}{2}$ or 1. The switches that control the divide circuits can be remotely located from the governor and can therefore be controlled by an operator, say for example, operating a hydraulic boom that is obtaining its power from the engine being controlled. For the sake of simplicity, the invention will be described with divider 14 inoperative and the divider 12 set at 3 divided by 3 so that there is a one-to-one correspondence between the number of pulses being produced by the engine under control and the number of pulses entering counter 16.

As mentioned earlier the counter counts the number of pulses being introduced into the governor over a predetermined time period T. Clock circuit 18 controls both the counter 16 and the latch circuit 20 via clear pulse generator and latch pulse generator 22 and 24, respectively. Signals from the latch pulse generator activate the clock pulse generator. The clear pulse generator 22 sets the counter 16 to zero. The counter 16 is connected to the latch circuit 20 which is inoperative until it receives a pulse from latch pulse generator 24 at which time it is activated and signals at its output follow signals at its input until the end of the latch pulse at which time the output is "frozen" or stored at a particular count. This count represents the number of pulses fed from the ignition system of an engine being controlled for the particular time period T. The clock circuit produces a pulse every period T. The combination of the clear pulse generator and the latch pulse generator arrange and generate pulses in the proper sequence and at the proper times to produce clear and latch pulses. Once the latch pulse ends, which stores the current input to the latch as its output signal, a clear pulse is generated which resets the counter to zero to allow it to count the pulses for the next time period T. The counter and the latch can operate for example in BCD (binary coded decimal). As a result, the counter 16 receives a sequential train of pulses and converts the count of these pulses into 2, 4-bit BCD numbers. The latch 20 ignores these continuously updated 2, 4-bit BCD numbers until it is actuated by a latch pulse. Immediately upon the termination of the latch pulse, the latch circuit 20 stores at its output the 2, 4-bit BCD numbers representing the number of pulses counted in the time period T. This stored information is fed to the comparator 26.

Tumble switches 28 and 30 are used to input to the comparator an upper and lower bound, respectively. For example, the upper bound could be 3300 RPM so that—the tumble switch 28 would be set at 33 and would feed a 2, 4-bit BCD number to the comparator 26. This number is indicated by " in in FIG. 1. Similarly, the tumble switch 30 could be set at 29 representing a lower limit of 2900 RPM for the governor. This 2, 4-bit BCD number is fed to the comparator 26. This lower bound is represented generally by the number "B". The actual count stored in the latch 20 is represented by the number "C". The information "C" can optionally be fed to a standard BCD to 7-bit decoder and to a digital display 32.

If the value of "C" is greater than the value of "A" the comparator activates high relay 34 which is connected to the fuel flow system of the engine. Activation of relay 34 reduces the fuel flow which reduces the value of "C" bringing the RPM of the engine down below the value "A". If the value of "C" is less than the value of "B" comparator 26 activates low relay 36 which is connected to the fuel flow system of the engine and increases the fuel flow to speed up the engine so that the value of "C" becomes greater than "B".

FIG. 2 illustrates the relationship between the latch pulse and the clear pulse over a time period T. The graph also shows the pulses counted during a time period T. It should be noted that the latch pulse generator activates the clear pulse generator so that the clear pulse is always delayed in time slightly after the termination of the latch pulse. This insures that the latch will store the count in the counter for a given time period before the counter clears to zero to begin counting the next sequence of pulses for the next time period T.

Figure 3:
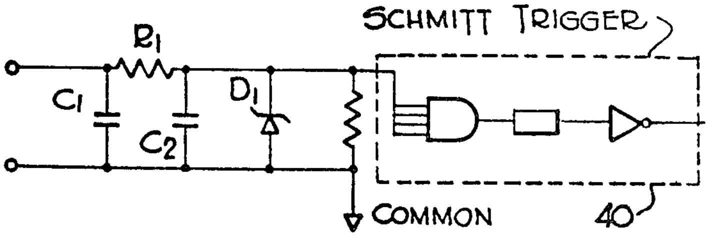

A specific embodiment of the present invention will now be described with respect to FIGS. 3 through 7. FIG. 3 is a schematic diagram of the pulse shaper 10 shown in FIG. 1. The combination of capacitors C1, C2 and resistor R1 represent a low pass filter. This eliminates ring due to contact bounce in the ignition circuitry and also attenuates spurious higher frequency signals. Zener diode D1 clips the signal so that it will not damage the Schmitt trigger 40. The output of the Schmitt trigger is a train of well defined square pulses with each square pulse corresponding to an input pulse from the ignition system of the engine.

FIG. 4 is a schematic diagram of the clock 18, the latch pulse generator 24 and the clear pulse generator 22 shown in FIG. 1. Clock generator 42 produces a positive going pulse after each elapsed time period T. The length of time period T may be adjusted by potentiometer 44, which, forms part of the RC circuit comprising resistor 46 and capacitor 48. The discharge of the capacitor determines the time period T and the rate of discharge can be controlled via potentiometer 44.

Output line 50 of the clock generator 42 feeds one input of AND gate 52. The other input of AND gate 52 is always at a higher logic level by virtue of grounded inverter 54. The combination of AND gate 52 and flip-flop 56 make up a retriggerable monostable multivibrator. The flip-flop 56 therefore will output on line 58 a positive going pulse for every positive rising edge of each pulse on line 50. This positive pulse on line 58 is the latch pulse for use in the remainder of the circuitry.

The clear pulse generator consists of an inverter 60, AND gate 62 and flip-flop 64, which form another retriggerable monostable multivibrator.

In this particular instance, the non-inverted input of the AND gate 62 is held at a high logic level and so a positive going pulse appears at the output line 66 for every negative going pulse edge at the input to inverter 60. As a result, the positive going pulse at line 66 is always retarded in time with respect to the positive going pulse on line 58. The positive going pulse on line 66 is the clear pulse.

To summarize, the circuit in FIG. 4 produces a series of positive going latch pulses separated by a time period T at line 58 and a series of positive going clear pulses separated by time period T and retarded in time with respect to the latch pulses, at line 66.

Figure 5:
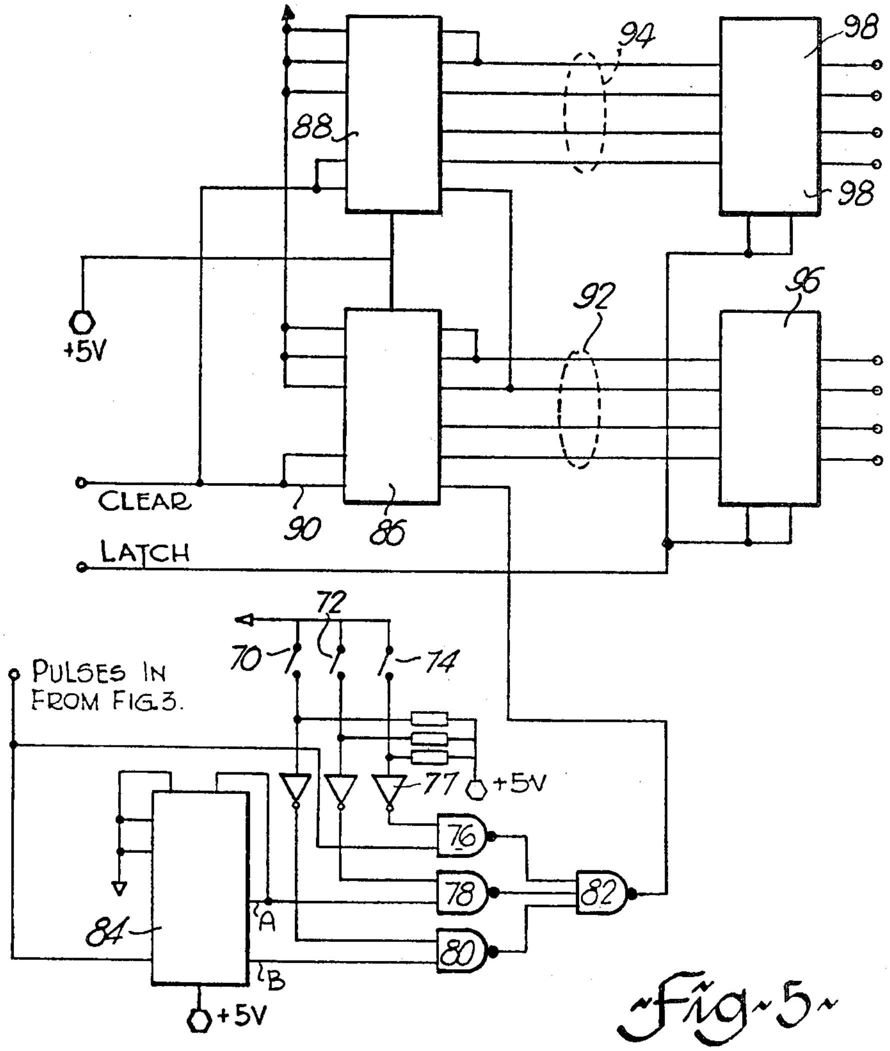

FIG. 5 is a schematic diagram of the divide-by-4 circuit 14, the counting circuit 16 and the latching circuit 20 of FIG. 1.

With regard to the divide-by circuit, the divide-by-one function is operated by closing switch 74. This puts a high level logic voltage on input 1 of NAND gate 76 via inverter 77. The pulse train to be counted is fed to input 2 of NAND gate 76. As a result, the output of NAND gate 76 follows 180° out of phase the pulse at the input from FIG. 3. Since switches 70 and 72 are open, NAND gates 78 and 80 are inactive and so they feed high logic level voltages to inputs 2 and 3 of NAND gate 82. As a result, NAND gate 82 is activated by high logic level pulses from NAND gate 76 and the output of NAND gate 82 is in phase and follows the pulses being fed from the pulse shaper 10 in FIG. 1.

A 4-bit binary counter 84 also receives pulses at its input from input pulse shaper 10. The 4-bit binary counter translates the sequential pulses into a 4-bit BCD code. The "A" bit line of the counter will therefore always have a high logic level voltage impressed on it for every odd count. This "A" line is connected to input 2 of NAND gate 78. When switches 70 and 74 are open and switch 72 is closed a high logic level voltage is applied to input 1 of NAND gate 78 and operates in conjunction with NAND gate 82 to produce a train of pulses having ½ the number with respect to the pulses sensed at the engine ignition.

The "B" bit line of 4-bit binary counter 84 has impressed thereon a pulse sequence which contains ¼ of the number of pulses as was impressed on its input. This output is fed to input 2 of NAND gate 80 which is activated via input 1 by switch 70. NAND gate 80 in conjunction with NAND gate 82 produce a pulse train having one quarter the number of pulses with respect to the train sensed by the engine ignition.

For the sake of simplicity the remainder of the description of this embodiment will be carried out with switches 70 and 72 opened and switch 74 closed so that the divider is dividing by 1 and the pulse train appearing at the output of NAND gate 82 is the same as the pulse count being sensed at the ignition circuit of the engine.

The divide by 3 unit will not be described herein. However, it can be placed in parallel with the divide by 4 unit and functions in a similar manner.

Decade counters 86 and 88 are cascaded to convert the series of pulses being fed from NAND gate 82 into counted BCD. Counter 86 represents the "one hundreds" count of the RPM for a given time period T and counter 88 represents the "thousands" count. As mentioned above the time period T is determined by the separation of the clear pulses, which, in turn, control the counters. Clear line 90 connects with each counter 86 and 88.

The counted BCD information is fed from the counters 86 and 88 on 2, 4-line connections 92 and 94 respectively. The counters feed two latching circuits 96 and 98. As mentioned above these circuits are dorment until they are activated by a latching pulse. The latching circuits 96 and 98 store, at their output, the value of their input upon the termination of the latch pulse. The latching circuits 96 and 98 are activated by the rising edge of the latch pulse and they store their current value on the occurrence of the falling edge of the latch pulse.

FIG. 6 is a schematic diagram of the comparator and relay circuitry of a particular embodiment according to the present invention. The comparison of the data stored in the latching circuits 96 and 98 with the upper bound data is performed by the cascaded arrangement of 4-bit magnitude comparators 100 and 102. The comparison of the data stored in the latching circuits 96 and 98 with the lower bound data is performed by the cascaded arrangement of 4-bit magnitude comparators 104 and 106. A set of terminals 108 and 110 represent the "hundreds" and "thousands" digits of the tumble switches representing the upper bound. Even though these switches indicate in numbers to the base 10 they connect their various terminals with the common terminal so that the upper bound is fed to the comparator 100 and 102 in the form of a BCD. The upper bound input to the comparators 100 and 102 is represented by the BCD number "A". The BCD number entering the comparator from the latching circuits is represented by "C". If "C" is greater than "A" output line 112 feeds a high logic level voltage to the base of transistor 114. This transistor is biased on, thereby activating relay RE'. This action closes normally open contact 116 which illuminates LED 118 to indicate that the governor is operating to reduce engine RPM. The activation of relay RE' also closes normally open contact 120 which is connected in series with a solenoid which in turn is activated to reduce fuel flow to the engine to thereby reduce the RPM so that the value of "C" is less than the value of "A". When this situation occurs, output line 112 of comparator 102 goes to a low logic level voltage thereby deactivating relay RE'.

Similarly, the lower bound data may be fed to comparators 104 and 106 by appropriate connections at terminals 122 and 124 accomplished by the setting of the tumble switches for the lower bound. This lower bound may generally be represented by the BCD number "B". If "B" is greater than "C" comparator 106 outputs a high logic level voltage on line 126 which in turn activates transistor 128 thereby activating relay $RE^2$. Normally opened contact 130 is thereby closed, activating LED 132 to indicate that the governor is operating to increase engine RPM. Normally open contact 134 is also closed. This action energizes a solenoid in the fuel flow system of the engine which has the effect of increasing the engine RPM.

As mentioned above the governor can also be employed as a digital tachometer. FIG. 7 is a schematic diagram of a decoder and display. The decoder is connected to the latch-comparator interface shown in FIG.

6. Decoders 136 and 140 decode the BCD data to a 7 line drive for operating the LED displays 142 and 144.

It should be noted that the present invention can operate using only an upper bound value. If this embodiment of the invention is employed the engine is controlled against over-reving which can occur when a load is suddenly removed from the engine.

What is claimed is:

1. An electronic digital governor for controlling the RPM of an engine comprising:

(a) clock generator means including a clear pulse generator and a latch pulse generator;

(b) a sensor for receiving a train of pulses whose number per unit time is proportional to the RPM of said engine;

(c) counting means connected to said sensor means for counting the number of pulses in said train of pulses, said count being carried out between consecutive clear pulses fed to said counter by said clear pulse generator;

(d) latch means connected to said counting means, for storing a count accumulated between consecutive clear pulses, said latch being controlled by latch pulses from said latch pulse generator, the time duration between consecutive clear pulses and consecutive latch pulses being the same and equal to a predetermined time period T;

(e) comparator means having a first input connected to said latch and a second input connected to a switch means which is manually controllable to enter an upper bound RPM value, wherein said comparator means compares said stored count with said upper bound RPM value and activates a relay if said stored value is greater than said upper bound RPM value; and (f) an electromechanical device, controllable by said relay for controlling the RPM of said engine to reduce the RPM below said upper bound RPM value.

2. An electronic digital governor according to claim 1, further comprising a second comparator means having a first input connected to said latch means and a second input connected to a second switching means which is manually controllable to enter a lower bound RPM value, wherein said second comparator means compares said stored count with said lower bound RPM value and activates a second relay if said stored value is less than said lower bound RPM value; and a second electromagnetic device controllable by said second relay for controlling the RPM of said engine to increase said RPM above said lower bound RPM value.

3. An electronic digital governor according to claim 2, wherein said comparator means consists of the cascade arrangement of first and second 4-bit magnitude comparators and wherein said switch means enters the BCD value of said upper bound RPM value in said first and second 4-bit magnitude comparators.

4. An electronic digital governor according to claim 2, wherein said second comparator means consists of the cascade arrangement of first and second 4-bit magnitude comparators and wherein said second switching means enters the BCD value of said lower bound RPM value in said first and second 4-bit magnitude comparators.

5. An electronic digital governor according to claim 1 wherein said counting means is connected to said sensor via a pulse shaper which acts to attenuate spurious voltages and which limits the voltage level of the train of pulses.

6. The electronic digital governor according to claim 5, wherein said pulse shaper includes a low pass filter, a zener diode and a Schmitt trigger.

7. An electronic digital governor according to claim 5, wherein said counting means is connected to said pulse shaper via a divider network which manually controllably divides the number of pulses in said train of pulses by $\frac{1}{4}$ or $\frac{1}{2}$ or 1.

8. An electronic digital governor according to claim 5, wherein a second divider network is connected in parallel with said first divider network and wherein said second divider network manually controllably divides the number of pulses in said train of pulses by $\frac{1}{3}$ or $\frac{2}{3}$ or 1.

9. An electronic digital governor according to claim 1, wherein said clock generator means is comprised of a pulse generator including an adjustable RC network which determines the repetition rate of the pulses and wherein the repetition rate is adjusted to be 1.2/x where x is the number of cylinders of said engine.

10. An electronic digital governor according to claim 9, wherein said latch pulse generator consists of a retriggerable monostable multivibrator, said clock generator means being connected to said retriggerable monostable multivibrator so as to trigger said retriggerable monostable multivibrator to produce a positive logic pulse upon receipt of a low-high logic level voltage transition.

11. An electronic digital governor according to claim 10, wherein said clear pulse generator consists of a second retriggerable monostable multivibrator, said first mentioned retriggerable monostable multivibrator being connected to said second retriggerable monostable multivibrator so as to produce a positive logic pulse upon receipt of a high-low logic level voltage transition.

12. An electronic digital governor according to claim 11, wherein said counting means consists of a cascade arrangement of first and second decade counters, wherein said counters count the number of pulses in said pulse train for said time period T and convert said count to a BCD number (binary coded decimal).

13. An electronic digital governor according to claim 12, wherein said latch means consists of first and second 4-bit bistable latches, said latches storing at their output the BCD number of said count upon receipt of said high-low logic level transition of a latch pulse.

14. An electronic digital governor according to claim 13, wherein first and second BCD to 7 segment converters have their inputs connected to the outputs of said first and second 4-bit bistable latches, and wherein said converters each drive a 7 segment LED to thereby provide a digital display of the RPM of the engine.

* * * * *